US011226970B2

(12) United States Patent
Wada et al.

(10) Patent No.: US 11,226,970 B2
(45) Date of Patent: Jan. 18, 2022

(54) SYSTEM AND METHOD FOR TAGGING DATABASE PROPERTIES

(71) Applicant: Hitachi Vantara LLC, Santa Clara, CA (US)

(72) Inventors: Tomoya Wada, New York, NY (US); Winnie Cheng, West New York, NJ (US); Rohit Mahajan, Iselin, NJ (US); Alex Mylnikov, Edison, NJ (US)

(73) Assignee: HITACHI VANTARA LLC, Santa Clara, CA (US)

( * ) Notice: Subject to any disclaimer, the term of this patent is extended or adjusted under 35 U.S.C. 154(b) by 208 days.

(21) Appl. No.: 16/145,825

(22) Filed: Sep. 28, 2018

(65) Prior Publication Data

US 2020/0104379 A1 Apr. 2, 2020

(51) Int. Cl.
*G06F 7/00* (2006.01)
*G06F 16/2457* (2019.01)
*G06F 16/22* (2019.01)
*G06F 16/901* (2019.01)
*G06F 16/9535* (2019.01)

(52) U.S. Cl.
CPC ...... *G06F 16/24578* (2019.01); *G06F 16/221* (2019.01); *G06F 16/9024* (2019.01); *G06F 16/9535* (2019.01)

(58) Field of Classification Search
CPC ............... G06F 16/221; G06F 16/3344; G06F 16/24578; G06F 16/35; G06F 16/353; G06F 16/134
See application file for complete search history.

(56) References Cited

U.S. PATENT DOCUMENTS

| | | | | |
|---|---|---|---|---|
| 6,622,144 | B1 * | 9/2003 | Rush, Jr. | G06F 16/284 707/600 |
| 7,036,064 | B1 * | 4/2006 | Kebichi | G11C 29/12015 714/731 |
| 8,688,435 | B2 * | 4/2014 | Nasri | G06F 40/232 704/9 |
| 9,410,956 | B1 * | 8/2016 | Cheng | C12Q 1/6886 |
| 9,471,883 | B2 * | 10/2016 | Chatterjee | G06F 16/35 |
| 9,785,830 | B2 * | 10/2017 | Hausmann | G06K 9/6218 |
| 2002/0087518 | A1 * | 7/2002 | Ellis | G06F 16/2462 |
| 2002/0152202 | A1 | 10/2002 | Perro et al. | |
| 2005/0055369 | A1 * | 3/2005 | Gorelik | G06F 16/24544 |

(Continued)

FOREIGN PATENT DOCUMENTS

WO 2017187207 A1 11/2017
WO WO2017187297 * 11/2017

OTHER PUBLICATIONS

The International Search Report and the Written Opinion of the International Searching Authority for PCT/US2019/043652, dated Jan. 16, 2020, ISA/RU, Moscow, Russia.

*Primary Examiner* — Daniel A Kuddus
(74) *Attorney, Agent, or Firm* — Mattingly & Malur, PC (57) ABSTRACT

A method and system for tagging database columns are presented. The method includes receiving an input column name of at least one column in a database; performing signature matching of the input column name to contents of a seed table; determining a first confidence score for the signature matching; and tagging a matching value in the seed table as a tag for the input column name, when a first confidence score exceeds a first threshold value.

16 Claims, 5 Drawing Sheets

(56) References Cited

U.S. PATENT DOCUMENTS

| | | | |
|---|---|---|---|
| 2005/0080613 A1* | 4/2005 | Colledge | G06F 16/951 |
| | | | 704/9 |
| 2006/0190789 A1* | 8/2006 | Kebichi | G11C 29/14 |
| | | | 714/733 |
| 2009/0012991 A1 | 1/2009 | Johnson et al. | |
| 2011/0145254 A1 | 6/2011 | Pragada et al. | |
| 2012/0072204 A1* | 3/2012 | Nasri | G06F 40/253 |
| | | | 704/9 |
| 2014/0337257 A1* | 11/2014 | Chatterjee | G06N 20/00 |
| | | | 706/12 |
| 2015/0356094 A1 | 12/2015 | Gorelik | |
| 2016/0225054 A1 | 8/2016 | Johnson et al. | |
| 2017/0011029 A1 | 1/2017 | Chatterjee et al. | |
| 2017/0091320 A1* | 3/2017 | Psota | G06F 16/334 |

* cited by examiner

SYSTEM AND METHOD FOR TAGGING DATABASE PROPERTIES

TECHNICAL FIELD

The present disclosure relates generally to systems using database systems, and more specifically to tagging of database properties including columns.

BACKGROUND

A database catalog of a database instance includes metadata in which definitions of database objects such as tables, views (virtual tables), synonyms, value ranges, indexes, users, and user groups are stored. For example, in relational databases, the database catalog is defined as the information schema (information_schema) is an ANSI-standard set of read-only views which provide information about all of the tables, views, columns, and procedures in a database.

The database catalog is defined by a programmer or database administrator (DBA) of the database. As such, the naming of various properties of the database may be assigned with or without context to the actual content. For example, a column in a database can be named as "CODE_A3". Such naming is out of context, as the database can hold information about an error code or a country code. Thus, the column's name may not be indicative of content (data) maintained by the column.

As programmers should follow standard specifications about the syntax of the databases, they are not required to follow certain rules with respect to the semantics of the database catalog. For example, for a database column maintaining country code, one programmer can name this column as "CODE_A3" while another as "CODE_CR".

The lack of an appropriate syntax in code and/or one conventional naming notation may lead, for example, to errors in retrieving data, thus downgrading the performance of applications relaying on data stored in the database. The errors in retrieving data are due to human errors in typing queries or mismatching column names.

This is the particular case in a multiple-database architecture, where different databases can be accessed by a single application. Each database can be defined by its own catalog. That is, each database can be configured with its own tables and columns, where each column's naming may be independent of the others. For example, Table 1 residing in one database and Table 2 residing in another database may be defined as follows:

TABLE 1

| CODE_A3 | CURR_A3 |
|---------|---------|
|         |         |

TABLE 2

| CONT_CODE | CURR_CODE |
|-----------|-----------|
|           |           |

In the above example, both columns "CODE_A3" and "CONT_CODE" maintain country codes (e.g., USA, GBR, or JPN) and both columns "CURR_A3" and "CURR_CODE" maintain currency codes. As demonstrated in the above example, although both tables contain the same distinct values, their columns' names do not indicate as such.

One of the problems resulting from utilizing two tables having inconsistent columns' names is that the tables cannot be merged without manually modifying the columns' names to be consistent. That is, without unifying the columns' names, a SQL join operation would fail. Single typing error in queries (i.e., error in syntax) leads to failure in SQL operation. To avoid such error, a complex query (e.g., query including regular expressions) may be needed. In a typical database deployment where there are hundreds of tables and thousands of columns, manually determining the context of each column and trying to identify corresponding columns is not feasible.

In order to address this problem, machine learning based solutions have been utilized to discover or tag columns' names. Such existing solutions require methods of digesting raw data (i.e., process raw data to generate a training dataset) and inputting the training dataset into a machine learning model.

One of the deficiencies of machine learning based solutions is a strong dependency on the training dataset used. The training dataset can be generated from a single "domain" of data source, for example, financial or medical related data source. Using such datasets, machine learning models can be trained and used to tag columns' names. Although the trained models can be used for a similar dataset, they may not perform for a different dataset. There is no training for multiple data domains on the same dataset, for example, financial data and medical data. As such, the trained dataset would be limited on a single domain and would not include aggregated financial and medical data.

Other deficiencies of machine learning based solutions are that such solutions cannot explain the type of data, the training machine learning models cannot be performed on confidential data, and feedback from the user may not be incorporated. As such, existing solutions cannot provide accurate tagging of columns' names in a multiple-database architecture.

Another widely used technique discussed in the related art which may be utilized allows mapping between different columns is the extract, transform, load (ETL) process. Data extraction is where data is extracted from homogeneous or heterogeneous data sources. Data transformation is where the data is transformed for storing in the proper format or structure for the purposes of querying and analysis. Data loading is where the data is loaded into the final target database, more specifically, an operational data store, data mart, or data warehouse.

An ETL process cannot uniquely tag columns' names, and thus to provide accurate merging to their respective tables. For example, one ETL process may produce "cust_id" for a column name in a first database, and another ETL process may output "customer_id" for a column name in a second database. As such, the tables from the first and second databases cannot be merged using a conventional SQL query.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for tagging database columns. The method includes receiving an input column name of at least one column in a database; performing signature matching of the input column name to contents of a seed table; determining a first confidence score for the signature matching; and tagging a matching value in the seed table as a tag for the input column name, when a first confidence score exceeds a first threshold value.

Certain embodiments disclosed herein also include a system for tagging database columns. The system comprises a processing circuitry; and a memory, the memory containing instructions that, when executed by the processing circuitry, configure the system to: receive an input column name of at least one column in a database; perform signature matching of the input column name to contents of a seed table; determine a first confidence score for the signature matching; and tag a matching value in the seed table as a tag for the input column name, when a first confidence score exceeds a first threshold value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for tagging metadata in database catalogs, and particularly columns' names of tables in such databases. In an embodiment, tagging includes the operation of translating column names in databases into tags. A tag is a short sentence (a number of words) describing the column name. In an example configuration, the length of a tag is 5 words. In an embodiment, the tagging is performed using natural language processing (NLP) methods designed to process columns' names in the multiple databases. The NLP methods are discussed in detail below.

Figure 1:
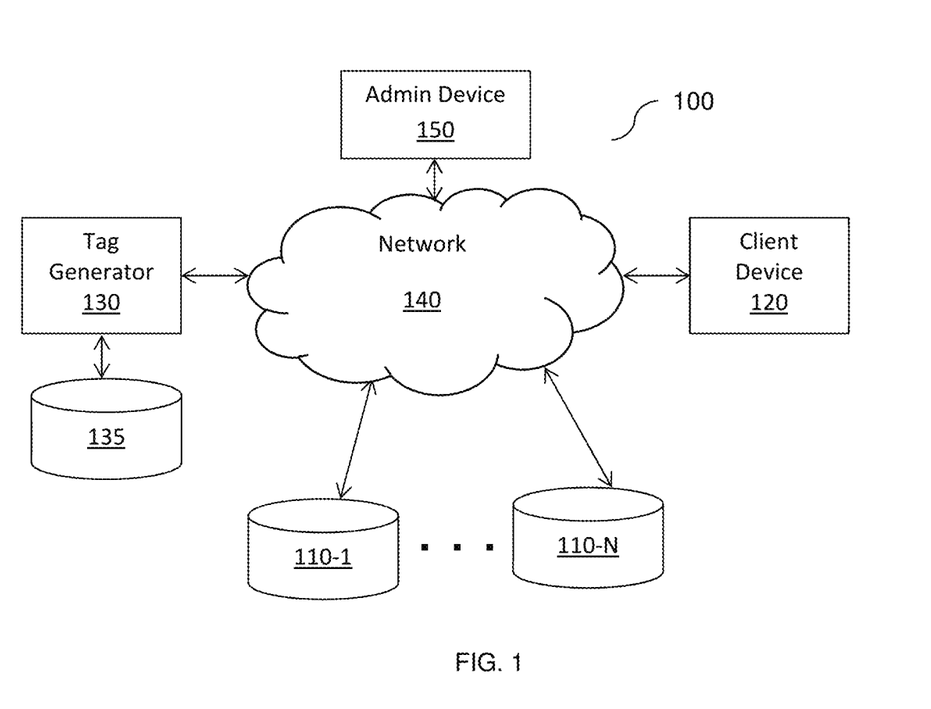
FIG. 1 is a network diagram utilized to describe various embodiments.

FIG. 1 is an example network diagram 100 utilized to describe the various embodiments. The network diagram 100 includes a plurality of databases 110-1 through 110-N (hereinafter referred to individually as a database 110 and collectively as databases 110 for simplicity), a client device 120, and a tag generator 130 using knowledge repository 135 communicatively connected via a network 140. The network 140 may be, but is not limited to, a wireless, cellular or wired network, a local area network (LAN), a wide area network (WAN), a metro area network (MAN), the Internet, the worldwide web (WWW), similar networks, and any combination thereof. In certain implementations, an administrator (admin) device 150 is communicatively connected to the network 140. The administrator device 150 is typically utilized by, for example, a database administrator (DBA) to configure the databases 110.

In an example embodiment, a database 110 is a relational database organized based on a schema or relational model and uses SQL as the language for querying and maintaining the data. A database schema, or database catalog, is the skeleton structure that represents the logical view of the entire database. The database schema defines how the data is organized, how the relations among them are associated, and how the database formulates all the constraints to be applied on the data. The database 110 may be, for example, Oracle®, Sybase®, Microsoft SQL Server®, Access®, Ingres®, and the like. In an embodiment, various databases are logical entities residing in the same physical structure.

It should be noted that a database 110 is not limited to a relational database. Each of the databases 110 may include a data lake, a data warehouse, a datastream, and the like. Further, each database may be NoSQL type of database (such as, but not limited to MongoDB).

By means of the client device 120, a programmer can access any of the databases 110. Such an access may be any operation that a user is authorized to performed on any database 110. A client device 120 may be, but is not limited to, a personal computer, a laptop, a tablet computer, a smartphone, a wearable computing device, and the like. In a typical arrangement, the databases 110 are deployed in an organization (e.g., an enterprise) where each database 110 may hold data related to a different department or to a business function. For example, a database 110-1 may be of an HR department and a database 110-2 may be of a legal department. Each database 110 may be configured with a different set of tables (not shown). Tables in different databases 110 may be utilized to maintain the same data in database columns configured with different columns names. For example, the databases 110-1 and 110-2 may be configured as shown in the following example Tables 3 and 4:

TABLE 3

| CODE_A3 | CURR_A3 |
|---------|---------|

TABLE 4

| CONT_CODE | CURR_CODE |
|-----------|-----------|

In an embodiment, the tag generator 130 is configured to tag columns' names in the tables maintained in the databases 110. The generated tags would describe the data maintained by a respective column in the correct context. For example, the tag for the column name "MT_ID" in a table in a database 110 would be "Money Transfer Identifier".

In an embodiment, the tag generator 130 utilizes a knowledge repository 135 to generate the tags. The knowledge repository 135 is pre-compiled and includes a seed table, data corpus, and discovery-assistance data (DAD). The seed table contains previously generated tags associated with their respective column names. The data corpus includes a pair of columns (key and value) extracted from a collection of text information from public and/or private domains (e.g., articles, blogs, web-sites, or any other textual information). The DAD contains information about similar columns and the relationship among these columns. The DAD is generated based on the contents (values) of the columns. The knowledge repository 135 may be updated over time as new tags are generated.

In an embodiment, the tag generator 130 may include a storage (not shown) for storing the generated tags. An example block diagram of the tag generator 130 is provided below with reference to FIG. 5. Alternatively or collectively, the tag generator 130 may be connected, for example, to an external storage device (not shown) for storing the generated tags and any user inputs.

In an embodiment, the tag generator 130 is configured to perform NLP methods using the information in the knowledge repository 135. The NLP methods include signature matching, probabilistic signature matching, and graph signature matching. Each method utilizes different data sources saved in the repository 135. In an embedment, the signature matching method utilizes the seed table, the probabilistic signature matching method utilizes the data corpus, and the graph signature matching method operates on the DAD. The NLP methods, in an embodiment, may be performed in sequence according to a specific order. In another embodiment, the NLP methods are performed parallelly, selectively, or both.

It should be noted that a tag can be generated by using one NLP method, some of the NLP methods, or all of the NLP methods. In an embodiment, each NLP method provides a score indicative of the accuracy of the tag generated by the respective NLP method.

Each NLP method is utilized to resolve different syntax and descriptiveness of the input column name. For example, the signature matching method for an input name "ACC_HOLDER_NAME_ALT" would output a tag "Alternative Account Holder Name". The probabilistic signature matching method for an input name "ACCHOLDER-NAMEALT" would output tag "Alternative Account Holder Name". The graph signature matching method would input the tag "Country Code" and for input column name "CODE_A3". The various NLP methods are discussed below.

It should be noted that FIG. 1 is described herein above with respect to a single client device 120 and a single administrator device 150 merely for simplicity purposes and without limitation on the disclosed embodiments. Multiple administrator devices, client devices, databases (of the same or different types), or a combination thereof, may be communicatively connected to the network 140 and the tag generator 130 without departing from the scope of the disclosure.

It should be further noted that the embodiments disclosed herein are not limited to the specific architecture illustrated in FIG. 1, and other architectures may be equally used without departing from the scope of the disclosed embodiments. Specifically, the tag generator 130 may reside in a cloud computing platform, a datacenter, and the like. Moreover, in an embodiment, there may be a plurality of tag generator systems operating as described hereinabove and configured to either have one as a standby, to share the load between them, or to split the functions between them. Further, in some embodiments, the tag generator 130 may be an internal component of a database 110. An example implementation of the tag generator 130 is described below.

Figure 2:
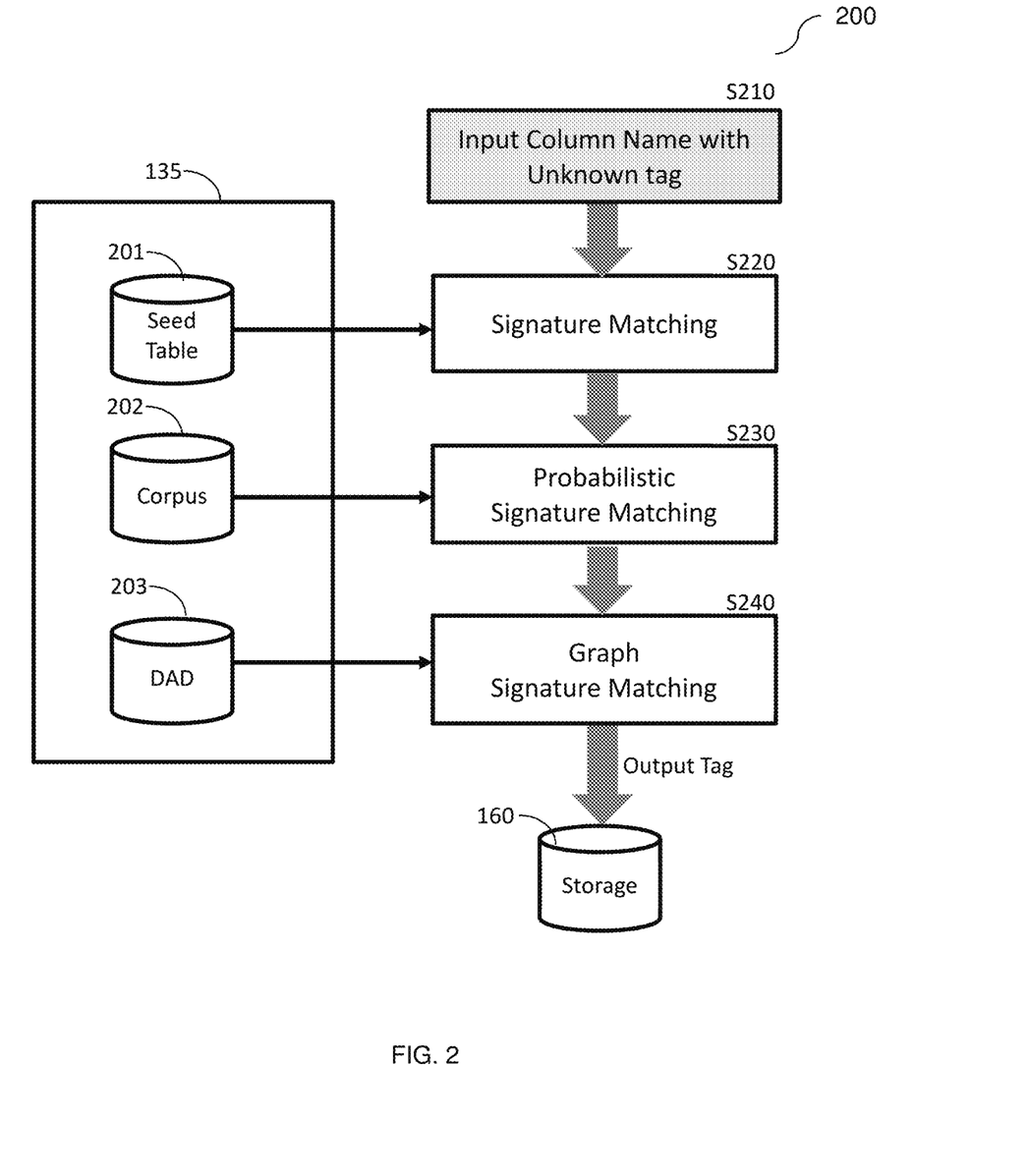
FIG. 2 is a flow diagram utilized to describe various embodiments of a process for tagging database columns.

FIG. 2 is an example flow diagram 200 utilized to describe various embodiments of a process for tagging columns in a database. The process is utilized to attempt to generate a descriptive tag for an input column name with unknown tag (hereinafter "input column name 210").

In an embodiment, at S220, the signature matching method is performed to find the corresponding tag of the input column name 210 to the contents of a seed table 201. As noted above, the seed table 201 includes previously discovered or other generated tags (value) associated with their respective column names (key).

In an embodiment, the signature matching method S220 attempts to match a key to a value. The key would be the input column name and the value would be a tag previously discovered for the respective key. Following is an example seed table 201:

TABLE 5

| Key | Value |
|---|---|
| CUSTOMER_ID | Customer identifier |
| USER_ID | User identifier |
| CODE_GENDER | Gender code |

In an embodiment, S220 includes finding the closest value in the seed table 201 and return the corresponding value as an output. For example, if the input column name from 210 is "USER_ID" the returned corresponding value is "User Identifier". However, the matching in most cases would not be an exact match. For example, the input column name may be "custid". Thus, the signature matching method would first identify the closest key in the seed table 201 (e.g., CUSTOMER_ID) and would return an output value of "Customer Identifier".

In an embodiment, the signature matching method performed at S220 may include a dictionary search and phonetic n-gram search to identify a matching key in the seed table. The dictionary search requires an exact copy of the input column name 210 to a key entry in the seed table 201. In an embodiment, the input column name 210 is searched against all entries in the seed table 201.

The phonetic n-gram search does not require an exact match to key entries, but rather the search is to identify key entries that phonetically sound similar to the input column names. As an example, hyphenated tags (e.g., USER_ID) would sound the same as underscored tags (e.g., USER-ID).

In an example embodiment, the phonetic n-gram search includes generating a phonetic fingerprint. Such fingerprint is based on a phonetic signature generated using a predetermined pronunciation schema, such as, but not limited to, a schema defined by the New York State Identification and Intelligence System (NYIIS), and n-gram signature generated based on the n-gram in the input column name. In an embodiment, a plurality of fingerprints are generated for each input column name (e.g., 210). In an example embodiment, the search of fingerprints against the key entries may be based on a MinHash LSH Forest search.

It should be noted that signature matching method can be used for other languages not limited to English.

If a tag cannot be generated by the signature matching method, a probabilistic signature matching method is performed (S230). The probabilistic signature matching method is performed on a trained data corpus 202 saved in the knowledge repository 135. In an embodiment, S230 includes finding the closest value in the data corpus 202 corresponding to a key.

In an embodiment, the probabilistic signature matching method performed at S230 may include first splitting the input column name 210 into a number of text segments (or n-grams) and searching, using the segments, for the closest values in the data corpus 202. In an embodiment, the probabilistic word splitting algorithm is utilized to provide the segments. As the generated segments may be out of context, the probabilities for the correct matching are determined in order to find the closest values. As an example, the input column name "custid" can be divided into the segments "cust" and "id". As another example, the "custid" can be divided into the segments "cu", "st" and "id". The former example can be matched to "Customer Identifier", while the latter example can be matched to "Copper Street Identifier". The probability that the "Customer Identifier" is an accurate term is higher than "Copper Street Identifier" and, therefore, "Customer Identifier" is selected as the output for the input.

In an embodiment, each segment is matched independently against the keys in the data corpus 202 and the most appropriate values (matching the keys) result in the output tag. An example demonstrating this process is provided in FIG. 3.

Figure 3:
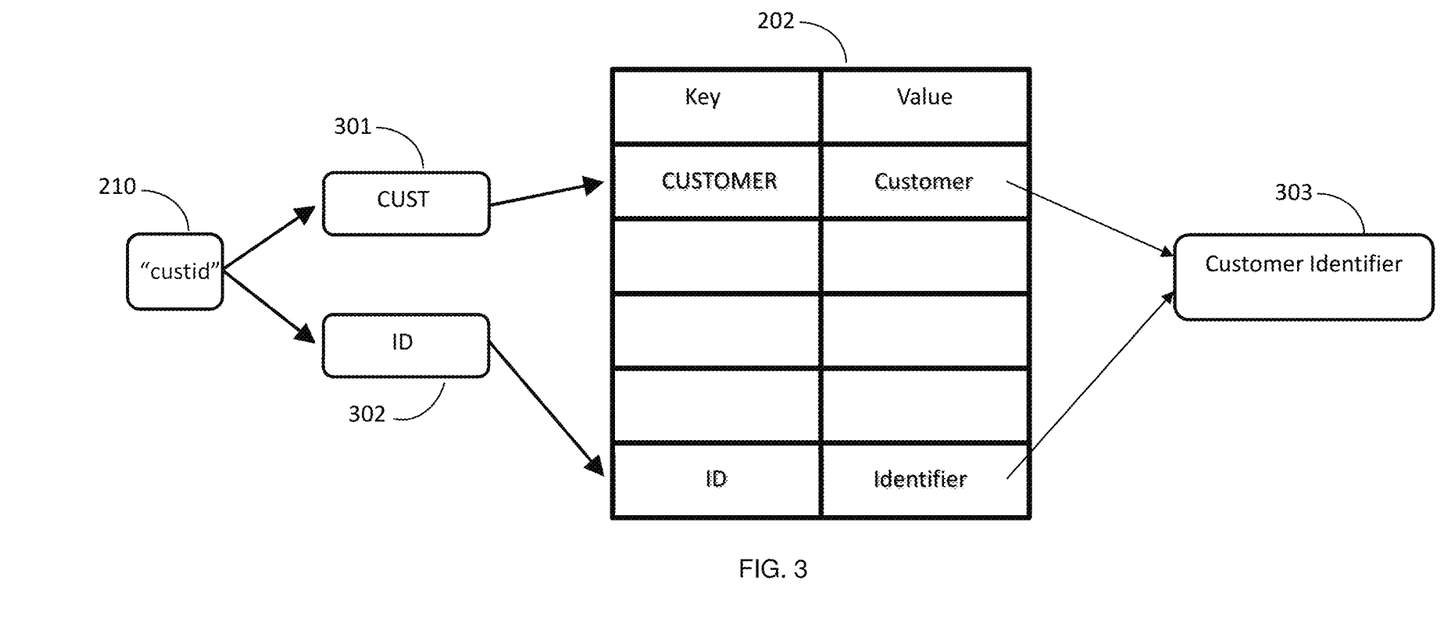
FIG. 3 is a diagram demonstrating a search of the data corpus for keys matching input column names according to an embodiment

Referring now to FIG. 3, an input column name (210) "custid" is split into the segment "cust" and "id" (labeled 301 and 302, respectively). The search against the corpus 202 identifies two matching values "customer" and "identifier". The output tag 303 is "Customer Identifier". The search of the n-grams against the corpus 202 can be performed using the signature matching method discussed above.

Returning to FIG. 2, when a tag cannot be generated by the probabilistic signature matching method, a graph signature matching method is performed (S240). This method is performed on a DAD 203 saved in the knowledge repository 135.

In an embodiment, the DAD 203 maintains data flows and relationship metadata. A data flow represents the similarities of two columns by looking at the contents (values) of the columns. For example, two columns, "COUNTRY_CODE" and "CONT_CODE" may have the same values, "JPN", "USA", and "GBR", even if they are in two different tables. That is, the data flows are indicative of similar tables based on their values. It should be noted that the same column may appear with different column names in different tables due to, for example, transferring of one column from one table to other tables as data flow.

In an embodiment, the relationship metadata is utilized to construct a graph (network) of the data flows. For example, besides the two columns mentioned above, another column "CODE_A3" in another table maintains the same values as the two columns ("COUNTRY_CODE" and "CONT_CODE"). Based on these three different tables, a graph of relationship can be constructed using the data flows of (i.e., <"COUNTRY_CODE", "CONT_CODE">, <"COUNTRY_CODE", "CODE_A3">, and <"CODE_A3", "COUNTRY_CODE">. Using the information of the graph, the column name "CODE_A3" (which has no meaning) can be mapped to "COUNTRY_CODE".

The input column name is matched independently against the entries of the graph, and the most appropriate values (matching the keys) result in the output tag. The graph holds information on the data flows and their relationships. In an embodiment, all output tags determined to be accurate are saved in a repository.

It should be noted that, in some implementations, only one or some of the NLP methods needs to be performed in order to output an accurate descriptive tag. The determination of whether to use additional NLP methods should be performed based on a confidence score computed after each stage.

Figure 4:
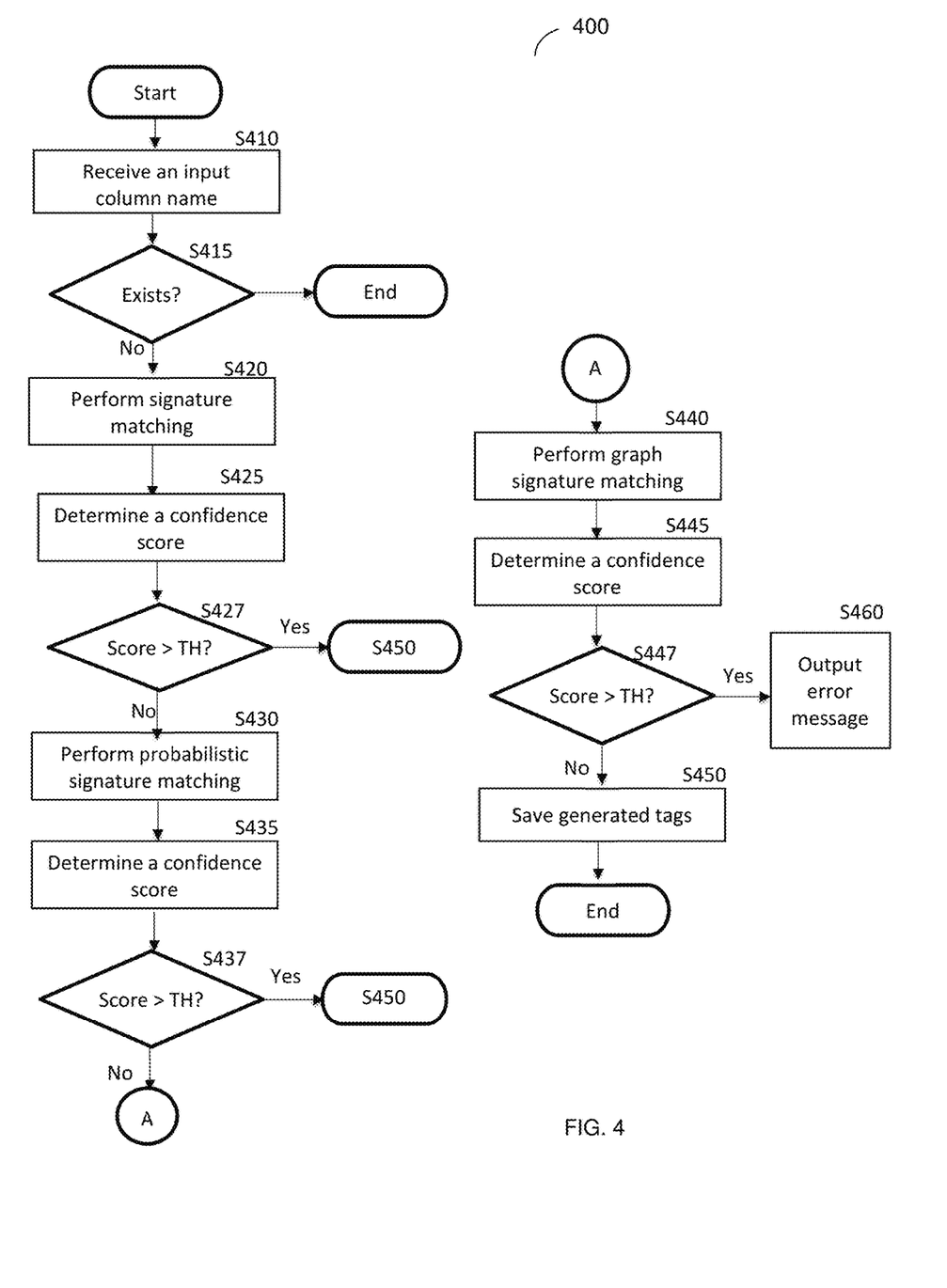
FIG. 4 is an example flowchart illustrating a method for tagging database columns according to an embodiment.

FIG. 4 is an example flowchart 400 illustrating a method for tagging database columns according to one embodiment.

At S410, an input column name to be tagged is received. At S415, it is checked if there is an existing tag already generated for the input column name. The check is against a repository of previously generated tags. If so, execution ends; Otherwise, execution proceeds to S420.

At S420, a signature matching is performed to generate a tag for the input column name. As discussed above, the signature matching is performed using information saved in the seed table. At S425, a confidence score is determined for the tag generated using the signature matching. The confidence score is a probability of the column-pair matching. The probability is computed based on the similarity of the column names. At S427, a check is made to determine if the confidence score for the signature matching is above a first predefined threshold value. If so, execution proceeds to S450, where the generated tag is saved in the storage device (FIG. 2, 160); Otherwise, execution continues with S430.

At S430, a probabilistic signature matching is performed to generate a tag for the input column name. As discussed above, the probabilistic signature matching is performed using information saved in the data corpus. At S435, a confidence score is determined for the tag generated using the probabilistic signature matching. Here, the confidence score is also a probability of the column-pair matching and is computed based on the similarity of the column names (input and generated tag). At S437, a check is made to determine if the confidence score for the signature matching is above a second predefined threshold value. If so, execution proceeds to S450, where the generated tag is received in the storage device (FIG. 2, 160). Otherwise, execution continues with S440.

At S440, a graph signature matching is performed to generate a tag for the input column name. As discussed above, the graph signature matching is performed using a graph representing data flows and their relationships. At S445, a confidence score is determined for the tag generated using the graph signature matching. In this embodiment, the confidence score is a probability of the column-pair matching and is computed based on the similarity of the values of the respective columns. For example, if two columns share a large number of distinct values, the probability of the similarity is high. At S447, a check is made to determine if the confidence score for the signature matching is above a predefined threshold value. If so, execution proceeds to S450, where the generated tag is received in the repository; otherwise, execution continues with S460, where an error message is output indicating that the input column name cannot be tagged. It should be noted that same or different threshold values can be configured to checking the confidence score. That is, the first, second and third threshold values may be the same or different.

Figure 5:
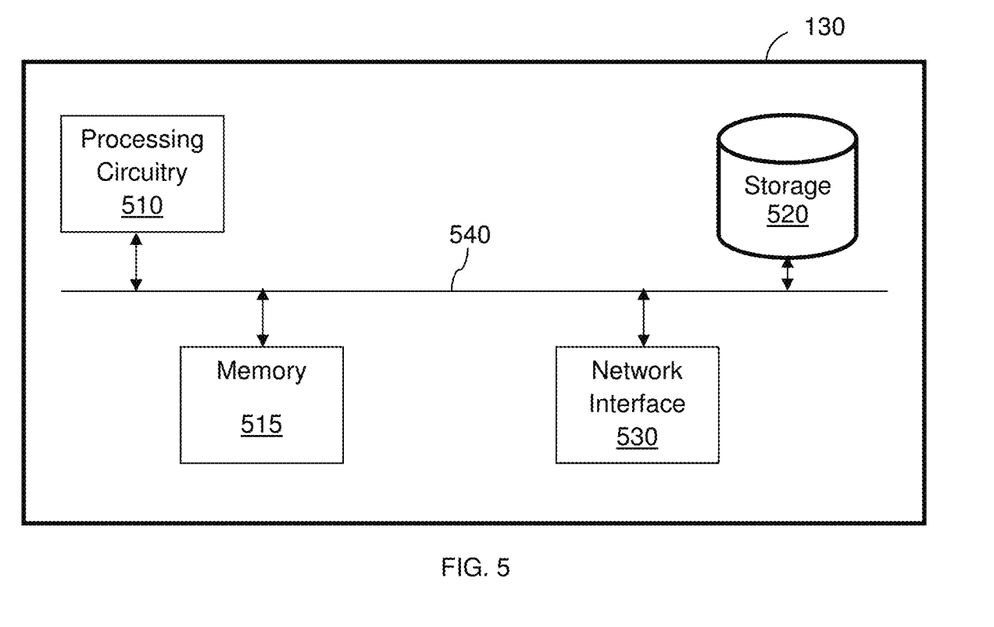
FIG. 5 is a block diagram of a tag generator according to an embodiment.

FIG. 5 shows an example block diagram of the tag generator 130 implemented according to an embodiment. The tag generator 130 includes a processing circuitry 510 coupled to a memory 515, a storage 520, and a network interface 530. In an embodiment, the components of the tag generator 130 may be communicatively connected via a bus 540.

The processing circuitry 510 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 515 may be volatile (e.g., RAM, etc.), non-volatile (e.g., ROM, flash memory, etc.), or a combination thereof. In one configuration, computer readable instructions to implement one or more embodiments disclosed herein may be stored in the storage 520.

In another embodiment, the memory 515 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 510 to perform the various processes described herein. Specifically, the instructions, when executed, cause the processing circuitry 510 to perform the process for tagging columns names, as discussed hereinabove.

The storage 510 may be magnetic storage, optical storage, and the like, and may be realized, for example, as flash memory or other memory technology, CD-ROM, Digital Versatile Disks (DVDs), or any other medium which can be used to store the desired information.

The network interface 540 allows the tag generator 130 to communicate with the client device (FIG. 1, 120), the knowledge repository (FIG. 1, 135), and the various databases (FIG. 1, 110).

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for tagging database columns, comprising:
receiving an input column name of at least one column in a database;
performing signature matching of the input column name to contents of a seed table, wherein the seed table contains previously generated tags associated with their respective column names, and wherein the signature matching is based on a natural language processing;
determining a first confidence score for the signature matching;
tagging a matching value in the seed table as a tag for the input column name, when the first confidence score exceeds a first threshold value, wherein the first confidence score is determined as a probability of the column-pair matching computed based on similarity of the column names; and
performing graph signature matching of the input column name to discovery-assistance data (DAD);
determining a third confidence score for the graph signature matching; and
tagging a matching value in a DAD table as a tag for the input column name when the third confidence score exceeds a third threshold value.

2. The method of claim 1, further comprising:
performing probabilistic signature matching of the input column name to contents of a data corpus table;
determining a second confidence score for the probabilistic signature matching; and
tagging a matching value in the seed table as a tag for the input column name when the second confidence score exceeds a second threshold value.

3. The method of claim 1, wherein performing signature matching of the input column name to contents of a seed table further comprising:
performing a natural language process to match a key to a closest value, wherein the key is the input column name and the value is an entry in the seed table.

4. The method of claim 3, wherein further comprising:
   performing a dictionary search and phonetic n-gram search to identify a matching key in the seed table.

5. The method of claim 1, wherein performing graph signature matching of the input column name to contents of the seed table further comprising:
   performing a natural language process to match a key to metadata representing relationship as maintained by the DAD table.

6. The method of claim 5, wherein the DAD table maintains data flows, wherein each data flow represents similarities of two columns based on their contents.

7. The method of claim 6, wherein relationship metadata is based on a graph of the data flows.

8. A non-transitory computer readable medium having stored thereon instructions for causing a processing circuitry to execute a process, the process comprising:
   receiving an input column name of at least one column in a database;
   performing a signature matching of the input column name to contents of a seed table, wherein the seed table contains previously generated tags associated with their respective column names, and wherein the signature matching is based on a natural language processing;
   determining a first confidence score for the signature matching;
   tagging a matching value in the seed table as a tag for the input column name, when the first confidence score exceeds a first threshold value, wherein the first confidence score is determined as a probability of the column-pair matching computed based on similarity of the column names; and
   performing graph signature matching of the input column name to discovery-assistance data (DAD);
   determining a third confidence score for the graph signature matching; and
   tagging a matching value in a DAD table as a tag for the input column name when the third confidence score exceeds a third threshold value.

9. A system for tagging database columns, comprising:
   a processing circuitry; and
   a memory, the memory containing instructions that, when executed by the processing circuitry, configure the system to:
   receive an input column name of at least one column in a database;
   perform a signature matching of the input column name to contents of a seed table, wherein the seed table contains previously generated tags associated with their respective column names, and wherein the signature matching is based on a natural language processing;
   determine a first confidence score for the signature matching;
   tag a matching value in the seed table as a tag for the input column name, when the first confidence score exceeds a first threshold value, wherein the first confidence score is determined as a probability of the column-pair matching computed based on similarity of the column names; and
   perform graph signature matching of the input column name to a DAD;
   determine a third confidence score for the graph signature matching; and
   tag a matching value in a DAD table as a tag for the input column name when the third confidence score exceeds a third threshold value.

10. The system of claim 9, wherein the system is further configured to:
    perform probabilistic signature matching of the input column name to contents of a data corpus table;
    determine a second confidence score for the probabilistic signature matching; and
    tag a matching value in the seed table as a tag for the input column name when the second confidence score exceeds a second threshold value.

11. The system of claim 10, wherein the system is further configured to:
    perform a natural language process to match a key to a closest value, wherein the key is the input column name and the value is an entry in the seed table.

12. The system of claim 11, wherein the system is further configured to:
    perform a dictionary search and phonetic n-gram search to identify a matching key in the seed table.

13. The system of claim 11, wherein the seed table includes previously discovered tags associated with their respective column names.

14. The system of claim 13, wherein the system is further configured to:
    perform a natural language process to match a key to metadata representing relationship as maintained by the DAD table.

15. The system of claim 14, wherein the DAD table maintains data flows, wherein each data flow represents similarities of two columns based on their contents.

16. The system of claim 15, wherein relationship metadata is based on a graph of the data flows.

* * * * *